July 13, 1948.   T. J. PFETCHER   2,445,122
COVER AND FILTER FOR MILKER PAILS
Filed Dec. 18, 1945   4 Sheets-Sheet 1
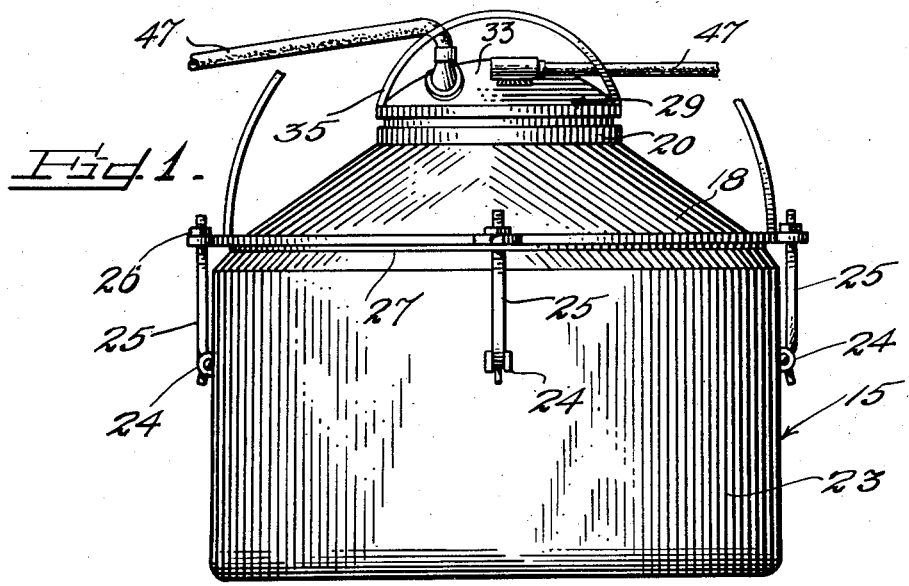
Inventor
THEOPHIL J. PFETCHER,
By Clarence A. O'Brien
and Harvey B. Jacobson
Attorneys

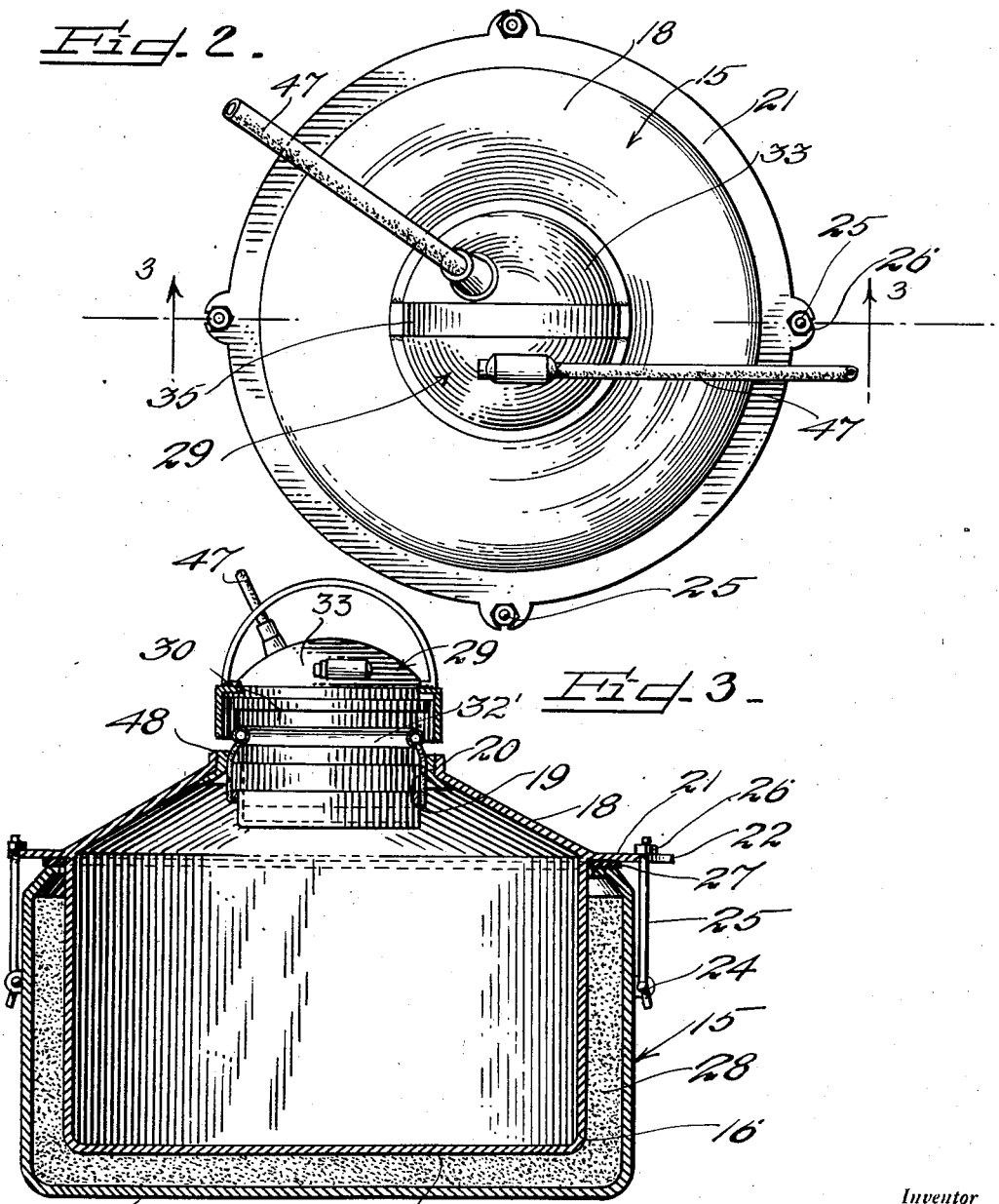

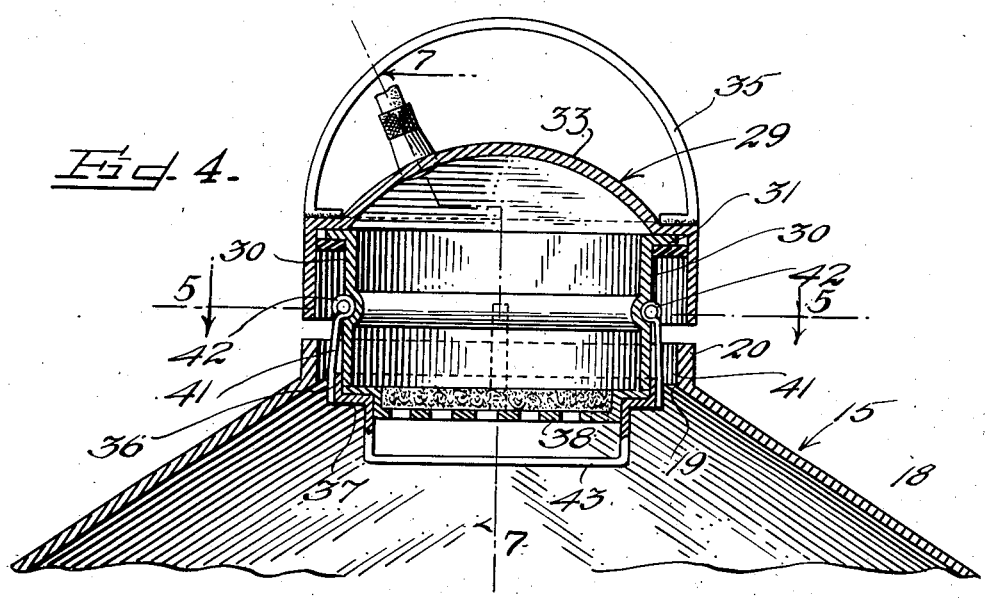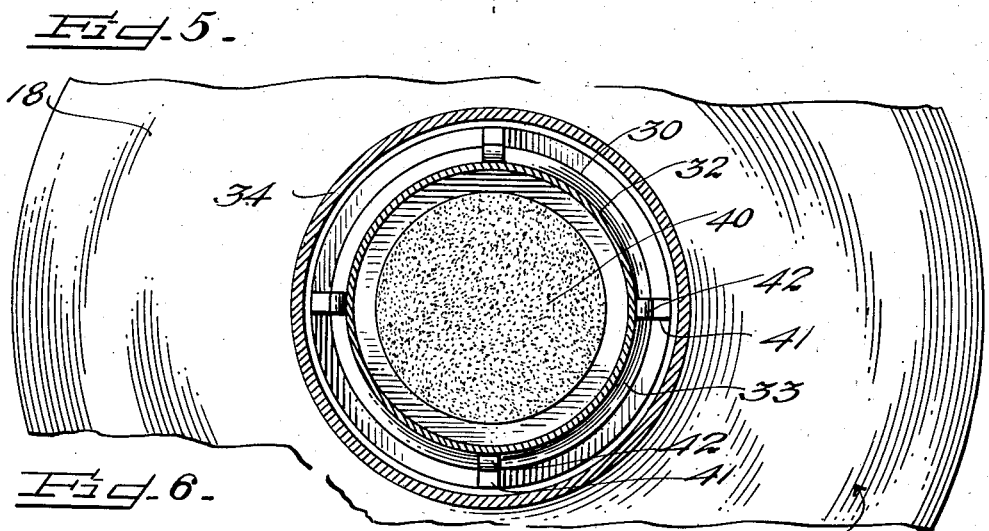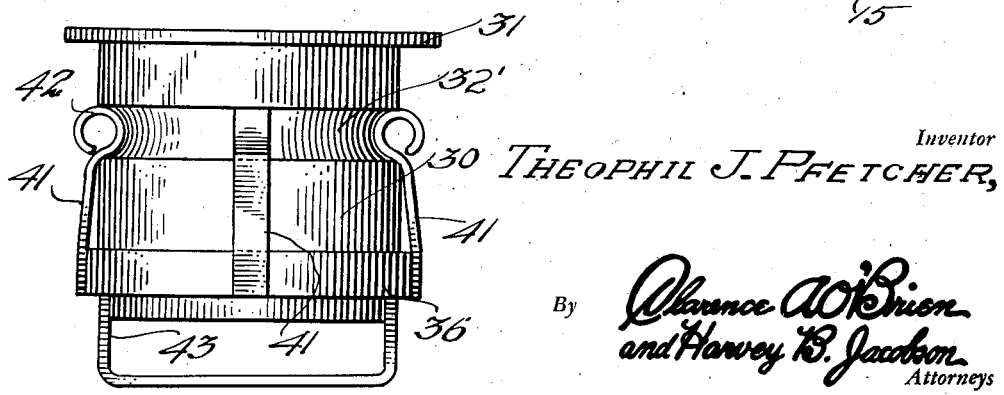

July 13, 1948. T. J. PFETCHER 2,445,122
COVER AND FILTER FOR MILKER PAILS
Filed Dec. 18, 1945 4 Sheets-Sheet 4
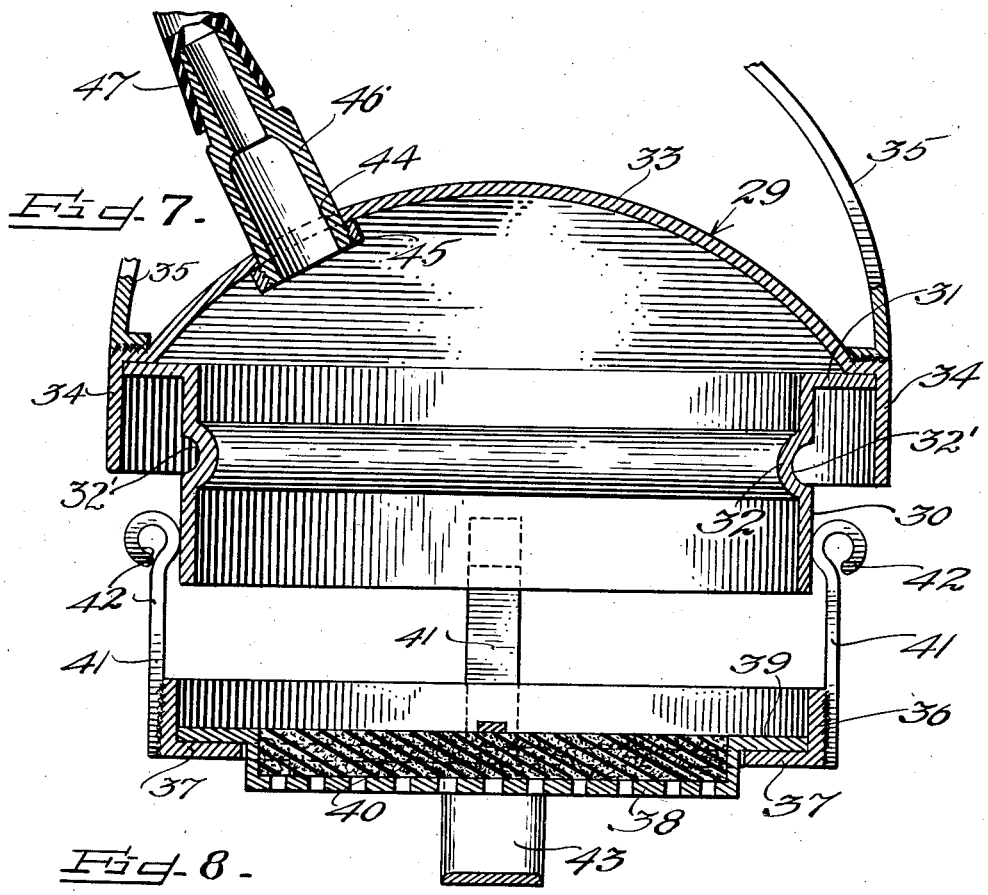
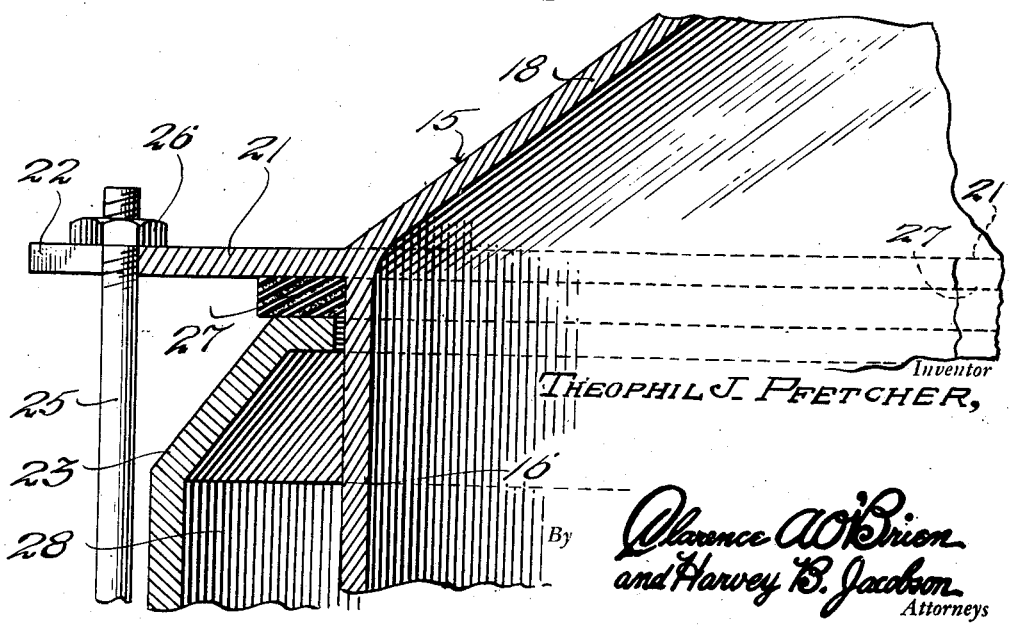

Patented July 13, 1948

2,445,122

UNITED STATES PATENT OFFICE 2,445,122

COVER AND FILTER FOR MILKER PAILS

Theophil J. Pfetcher, Norwalk, Wis.

Application December 18, 1945, Serial No. 635,636

1 Claim. (Cl. 31—4)

This invention relates to a cover and filter for a milker pail and has for its primary object to preserve milk uncontaminated from the time it leaves the milk producing animal until it is delivered to the consumer.

In the ordinary handling of milk it is customary to introduce the warm milk as it is extracted from the milk producing animal into an open pail or like receptacle and then to filter the milk into a larger container, which standing open, subjects the milk to contamination through contact with the surrounding atmosphere, such dust and dirt as may be present, and to contact with flies and like insects. It is well known that milk in a warm condition promotes bacterial growth and when the warm milk from the milk producing animal is handled as above described it becomes a veritable bacteria breeding-ground.

Another object of the present invention is to inhibit bacterial growth and preserve the milk sweet and clean from the time it leaves the milk producing animal until it is delivered to the consumer.

The above and other objects may be attained by employing this invention which embodies among its features extracting the warm milk from the animal and without exposing it to the surrounding atmosphere, filtering the milk so extracted, delivering the filtered milk to a receptacle sealed against atmosphere and chilling the milk while it is sealed against contamination within the receptacle.

Other features include a receptacle adapted to be surrounded by a refrigerant, a filter unit removably supported in said receptacle, means to seal the junction of the receptacle and filter unit from the surrounding atmosphere, a closure dome permanently enclosing the filter unit when the latter is in use and means connecting the interior of the filter unit through the dome with a milking machine in such a manner as to prevent the milk being delivered from a milk producing animal to the filter unit from being contaminated from the surrounding atmosphere.

Still other features include a filter unit comprising a tubular body, a dome-shaped cover closing the upper end of the body, means carried by a cover to establish connection with a milking machine, a perforated plate at the end of the tubular body opposite that carrying the flange, means to detachably connect the perforated plate with the tubular body and a filter pad supported on the perforated plate.

In the drawings:

Figure 1 is a side view on somewhat enlarged scale of the milk receptacle.

Figure 2 is a top plan view of Figure 1.

Figure 3 is a vertical sectional view taken substantially on the line 3—3 of Figure 2.

Figure 4 is a fragmentary enlarged sectional view through the filter unit.

Figure 5 is a transverse sectional view taken substantially on the line 5—5 of Figure 4.

Figure 6 is a side view of the tubular body of the filter unit showing the manner in which the filters are attached thereto.

Figure 7 is a vertical sectional view on an enlarged scale taken substantially on the line 7—7 of Figure 4 and showing the filter plate supporting ring partially removed, and Figure 8 is a fragmentary enlarged sectional view through the receptacle showing the junction between the milk containing element and the refrigerant containing element.

Referring to the drawings in detail this improved milk receptacle designated generally 15 comprises a container or vessel 16 of substantially circular cylindrical section closed at one end by a bottom wall 17 and at its other end by a frusto conical wall 18 having an opening 19 axially disposed with relation to the body 16 and surrounded by a flange 20. Formed at the junction of the hollow cylindrical body 16 and the frusto conical cover 18 is an upstanding annular flange 21 provided with peripheral notches 22 the purpose of which will more fully hereinafter appear.

Surrounding the receptacle 15 in concentric spaced relation thereto is a receptacle 23, the wall of which is preferably of a thermally insulated character to prevent the transmission of heat from the exterior to the interior. Secured at spaced intervals to the exterior of the cylindrical walls of the body 23 are ears 24 to which clamping bolts 25 are pivoted in such a manner that when the flange 21 rests on the upper edge of the outer receptacle 23 the bolts 25 may be entered into the notches 22 and clamped into place by means of suitable nuts 26. In certain instances, it will be found desirable to seal the junction of the flange 21 with the receptacle 23 and to this end I provide the upper edge of the cylindrical wall with an inturned annular flange on which a sealing gasket 27 is adapted to be supported so that when the nuts 26 are clamped on the flange 21 a fluid tight joint will be made between the parts. It will thus be seen that an annular chamber 28 surrounds the receptacle 16 which may contain a suitable refrigerant such as ice or dry ice so that the contents of the receptacle 16 may be chilled. Obviously when ice is used the sealing gasket 27 is employed in order to avoid loss of liquid between the junction of the flange 21 and the upper edge of the wall of the receptacle 23. When dry ice is used, however, the gasket 27 is removed to permit the escape of vapors from the chamber 28 and avoid building undue pressures therein.

The receptacle heretofore discussed is primarily for the purpose of receiving the milk fresh from a milk producing animal and rapidly cooling it to a point where bacterial growth is inhibited, and this receptacle will serve admirably such functions. However, in order to completely protect the milk from contamination I have devised a filter unit for use in conjunction with the receptacle just described, which filter unit is best illustrated in Figures 4 and 5 to 8 inclusive.

The filter unit above referred to is designated generally 29 and comprises a tubular body 30 formed at one end with an outstanding annular flange 31 and provided intermediate its ends with an inwardly depressed portion 32 forming an annular channel 32' the purpose of which will be more fully hereinafter explained. Welded or otherwise secured to the flange 31 is a dome shaped cover 33 provided at its periphery with a depending apron 34 to which a bail or like handle 35 is rigidly attached.

A supporting ring 36 is adapted to surround the lower open end of the tubular body 30 and is provided with an in-turned annular flange 37 upon which a perforated plate 38 is adapted to be seated. This plate is provided with an upwardly off-set annular flange 39 which when the parts are assembled is adapted to rest on the flange 37, and supported on the plate 38 within the confines of the inner edge of the flange 39 is an interchangeable filter pad 40. Welded or otherwise attached at spaced points to the periphery of the flange 36 are upwardly extending spring arms 41 the upper free ends of which are rolled as at 42 to form latches for engagement in the annular recess 32' to hold the ring 36, plate 38 and filter 40 in assembled position as illustrated in Figure 7. A suitable bail or handle 43 is attached to the under side of the flange 37 to aid in assembling and disassembling the parts. The dome 33 is provided at spaced points with openings 44 provided with in-turned internally screw-threaded flanges 45 into which nipples 46 are threaded to provide attachment for the hose connections 47 of a conventional milking machine.

In use it will be understood that the milk extracted from the milk producing animal will be delivered into the filter unit 29 and deposited on the filter 40. Flowing through the filter and the openings in the perforated plate 38 the milk is finally deposited in the receptacle 16 and immediately cooled through the contact with the chilled walls thereof which is cooled by the cooling medium contained in the chamber 28. In this way, the milk is filtered and cooled without exposure to the surrounding atmosphere with the result that its purity is preserved and bacterial growth is inhibited. It is, of course, understood that the junction of the tubular body 30 of the filter unit 29 with the flange 20 of the conical cover 18 is sealed against atmosphere by means of a suitable sealing gasket 48 which may be introduced into the flange 20 at this point.

The receptacle 16 is susceptible to use independently of the receptacle 15 though in its preferred form as above described the advantages of the rapid chilling of the milk are obvious. The filter unit 29 may readily be disassembled for cleaning by springing the rolled portions 42 out of the groove 32' and extracting the supporting ring 36 from its position on the tubular body 30, thus freeing the perforated plate 38 and the filter 40 supported thereby. When so disassembled the parts may readily be washed and sterilized and reassembled for use by the simple expedient of pushing the parts together so that the rolled portions 42 will engage in the groove 32', and to facilitate such assembling and disassembling of the device the bail 35 and the bail 43 may be employed. Obviously the filter unit may be suspended in the neck of an ordinary milk pail in which no cooling or refrigeration is employed.

From the foregoing, it will be obvious that milk leaving the milk producing animal will be delivered to the receptacle 16 in filtered condition where it may readily be chilled, all without exposure to the surrounding atmosphere and possible contamination through contact with insects and the like. Also, by so chilling the milk immediately upon its delivery into the receptacle 16 bacterial growth will be inhibited.

I claim:

A cover and filter for a milker pair comprising a tubular body having an annular peripheral channel intermediate its ends, an outstanding annular flange at one end of the tubular body, a dome-shaped top fixed to the flange and closing the adjacent end of the tubular body, a bail fixed at opposite ends to the flange and extending over the dome-shaped top in spaced relation thereto, a second tubular body adapted to encircle the first-mentioned tubular body adjacent the end remote from the flange thereon, an inwardly extending annular flange at one end of the second-mentioned tubular body, a perforated filter plate, an offset outstanding annular flange adjacent the periphery of the filter plate for engaging the inturned annular flange and supporting the filter plate in spaced parallel relation to the plane of the inturned flange, a removable filter pad supported on the filter plate, peripherally spaced substantially parallel spring arms fixed to the second-mentioned tubular body for engagement with the walls of the annular groove in holding the tubular bodies assembled, and an arched bail fixed to the second-mentioned body and extending across the filter plate in spaced relation thereto.

THEOPHIL J. PFETCHER.

REFERENCES CITED

The following references are of record in the file of this patent:

UNITED STATES PATENTS

| Number | Name | Date |
| --- | --- | --- |
| 2,241,916 | McNally | May 13, 1941 |
| 2,293,041 | Borden | Aug. 18, 1942 |